US011852584B2

(12) United States Patent
Kuebler et al.

(10) Patent No.: US 11,852,584 B2
(45) Date of Patent: Dec. 26, 2023

(54) MEASURING LIGHT SCATTERING OF A SAMPLE

(71) Applicant: Wyatt Technology, LLC, Goleta, CA (US)

(72) Inventors: Sigrid C. Kuebler, Old Orchard Beach, ME (US); Ross E. Bryant, Cape Elizabeth, ME (US); Shiladitya Sen, Goleta, CA (US); Ryan Olson, Goleta, CA (US); Nicholas Wong, Santa Barbara, CA (US); Marco Vanella, Santa Barbara, CA (US); Ryan Thomas, Santa Barbara, CA (US); Patrick Tufts, Santa Barbara, CA (US); Jared Naito, Santa Barbara, CA (US)

(73) Assignee: Wyatt Technology, LLC, Goleta, CA (US)

( * ) Notice: Subject to any disclaimer, the term of this patent is extended or adjusted under 35 U.S.C. 154(b) by 35 days.

(21) Appl. No.: 17/477,527

(22) Filed: Sep. 16, 2021

(65) Prior Publication Data

US 2022/0082498 A1 Mar. 17, 2022

Related U.S. Application Data

(60) Provisional application No. 63/079,434, filed on Sep. 16, 2020.

(51) Int. Cl.
*G01N 21/47* (2006.01)
(52) U.S. Cl.
CPC ..... *G01N 21/47* (2013.01); *G01N 2201/0227* (2013.01)

(58) Field of Classification Search
CPC .......... G01N 21/47; G01N 2201/0227; G01N 2021/135; G01N 21/13; G01N 21/51;
(Continued)

(56) References Cited

U.S. PATENT DOCUMENTS

| 2003/0214653 A1* | 11/2003 | Palumbo | G01N 21/51 356/338 |
| 2004/0004717 A1* | 1/2004 | Reed | G01N 15/14 356/338 |

(Continued)

FOREIGN PATENT DOCUMENTS

CN 2677970 Y * 2/2005

*Primary Examiner* — Tarifur R Chowdhury
*Assistant Examiner* — Alima Diawara Diawara
(74) *Attorney, Agent, or Firm* — Leonard Guzman

(57) ABSTRACT

The present disclosure describes an apparatus of measuring light scattering of a sample. In an embodiment, the apparatus includes (1) at least one display logically coupled to an enclosure housing a light scattering measurement instrument, where the at least one display is configured to allow for operating the instrument to acquire light scattering data from the sample and for accessing the data, (2) an indicator connected to an outside surface of the enclosure, where the indicator is configured to indicate at least one status of the instrument, (3) a sample chamber configured to accommodate at least one sample cell, where each of the at least one sample cell has a unique size and a unique shape, and (4) and a sample door connected to the enclosure, where the sample door is configured to seal the sample chamber, thereby providing thermal insulation to the sample chamber.

5 Claims, 8 Drawing Sheets

(58) Field of Classification Search
CPC ..... G01N 2201/022; G01N 2201/0221; G01N 2201/0222; G01N 2201/0224; G01N 2201/0225; G01N 2201/023; G01N 2201/0231; G01N 15/02; G01N 15/0205; G01N 15/0211; G01N 2015/0216; G01N 2015/0222
See application file for complete search history.

(56) References Cited

U.S. PATENT DOCUMENTS

| | | | |
|---|---|---|---|
| 2008/0143828 A1* | 6/2008 | Mandrachia | G01N 21/8507 348/82 |
| 2014/0233015 A1* | 8/2014 | Mander | G01N 21/49 356/440 |
| 2017/0255037 A1* | 9/2017 | Ma | G01N 21/8806 |
| 2020/0284725 A1* | 9/2020 | Zhao | G01N 21/0317 |
| 2021/0199580 A1* | 7/2021 | Drui | G01N 21/03 |
| 2021/0389305 A1* | 12/2021 | Nimri | G01N 21/253 |

* cited by examiner

MEASURING LIGHT SCATTERING OF A SAMPLE

PRIORITY

This application claims priority to U.S. Provisional Patent Application No. 63/079,434, filed Sep. 16, 2020.

BACKGROUND

The present disclosure relates to light scattering, and more specifically, to measuring light scattering of a sample.

SUMMARY

The present disclosure describes an apparatus of measuring light scattering of a sample. In an exemplary embodiment, the apparatus includes (1) at least one display logically coupled to an enclosure housing a light scattering measurement instrument, where the instrument is configured to measure at least one of dynamic light scattering, static light scattering, and electrophoretic light scattering, of at least one sample, where the at least one display is configured to allow for operating the instrument to acquire light scattering data from the sample and for accessing the data, (2) an indicator connected to an outside surface of the enclosure, where the indicator is configured to indicate at least one status of the instrument, (3) a sample chamber configured to accommodate at least one sample cell, where each of the at least one sample cell has a unique size and a unique shape, and (4) and a sample door connected to the enclosure, where the sample door is configured to seal the sample chamber, thereby providing thermal insulation to the sample chamber.

DETAILED DESCRIPTION

The present disclosure describes an apparatus of measuring light scattering of a sample. In an exemplary embodiment, the apparatus includes (1) at least one display logically coupled to an enclosure housing a light scattering measurement instrument, where the instrument is configured to measure at least one of dynamic light scattering, static light scattering, and electrophoretic light scattering, of at least one sample, where the at least one display is configured to allow for operating the instrument to acquire light scattering data from the sample and for accessing the data, (2) an indicator connected to an outside surface of the enclosure, where the indicator is configured to indicate at least one status of the instrument, (3) a sample chamber configured to accommodate at least one sample cell, where each of the at least one sample cell has a unique size and a unique shape, and (4) and a sample door connected to the enclosure, where the sample door is configured to seal the sample chamber, thereby providing thermal insulation to the sample chamber. In an embodiment, the at least one sample cell includes a cuvette. In an embodiment, the at least one sample cell is a cuvette.

Notably, current light scattering instruments have sample doors that provide no insulation to a sample chamber.

In an embodiment, FIG. 1A, FIG. 1B, FIG. 1C, FIG. 1D, and FIG. 1E depict the apparatus.

Display

In an embodiment, the at least one display is coupled to a top surface of the enclosure at a location behind the sample chamber. In an embodiment, the accessing includes at least one of displaying the data, printing the data, and transferring the data.

Sample Chamber

Figure 1A:
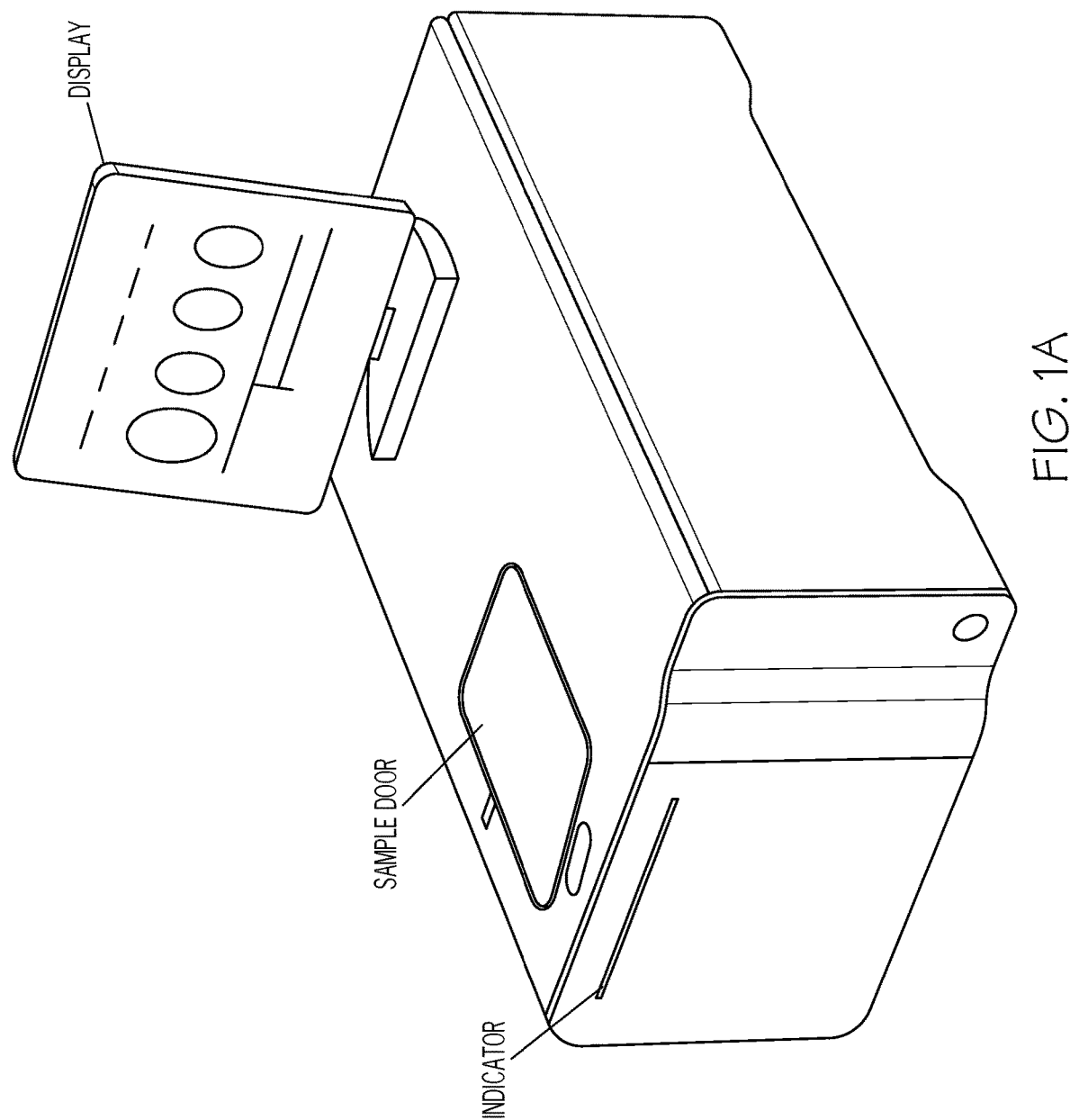
FIG. 1A depicts an apparatus in accordance with an exemplary embodiment.
Figure 1B:
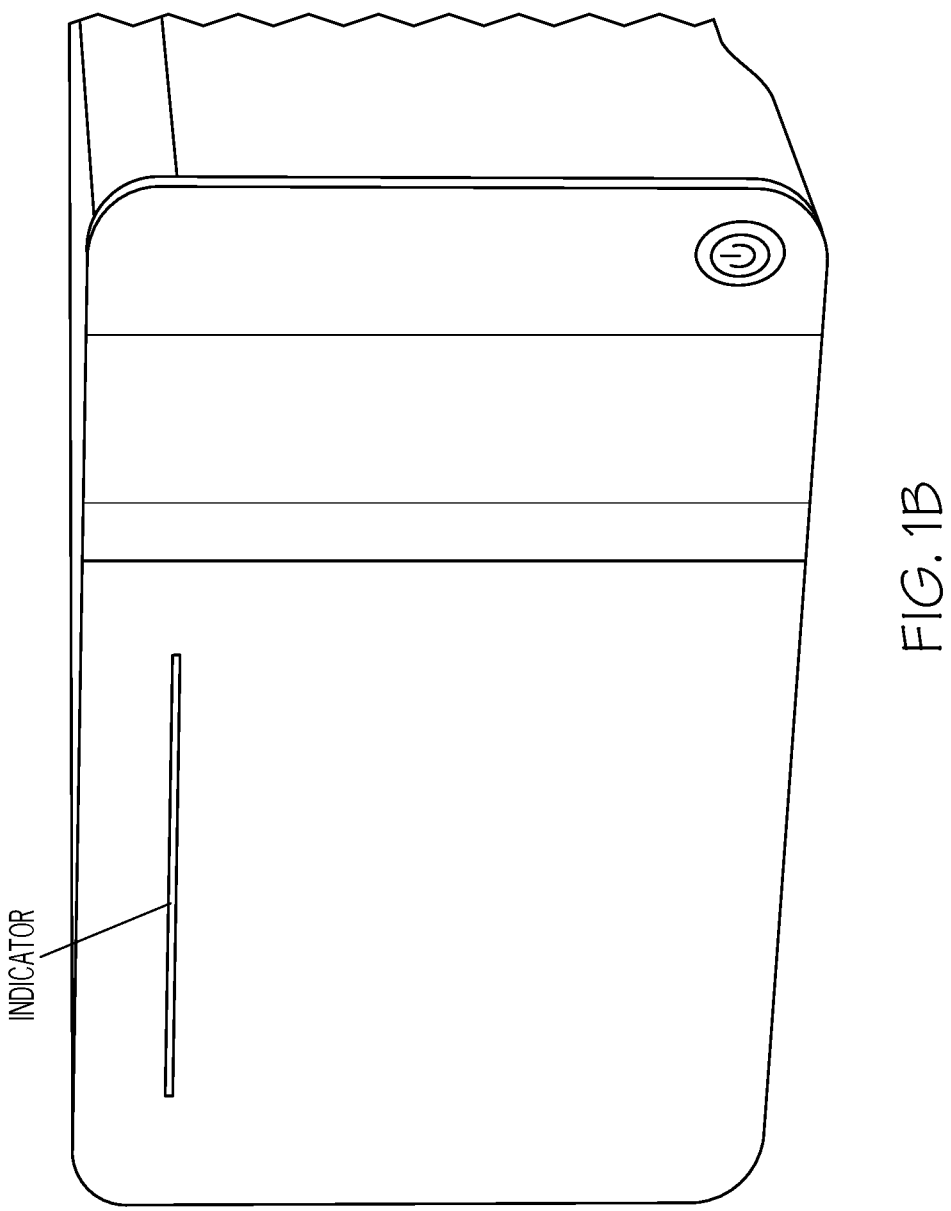
FIG. 1B depicts an apparatus in accordance with an exemplary embodiment.
Figure 1C:
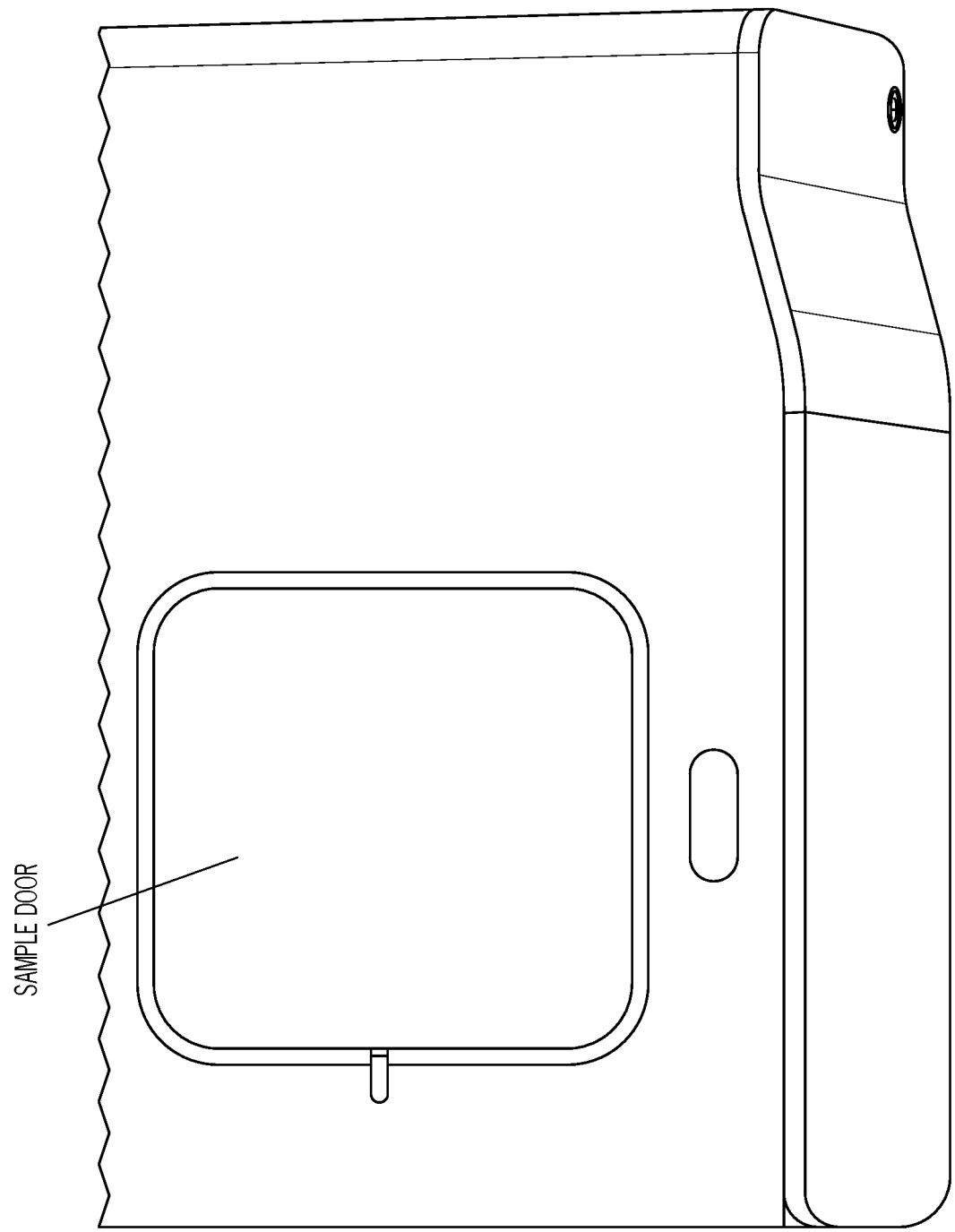
FIG. 1C depicts an apparatus in accordance with an exemplary embodiment.
Figure 1D:
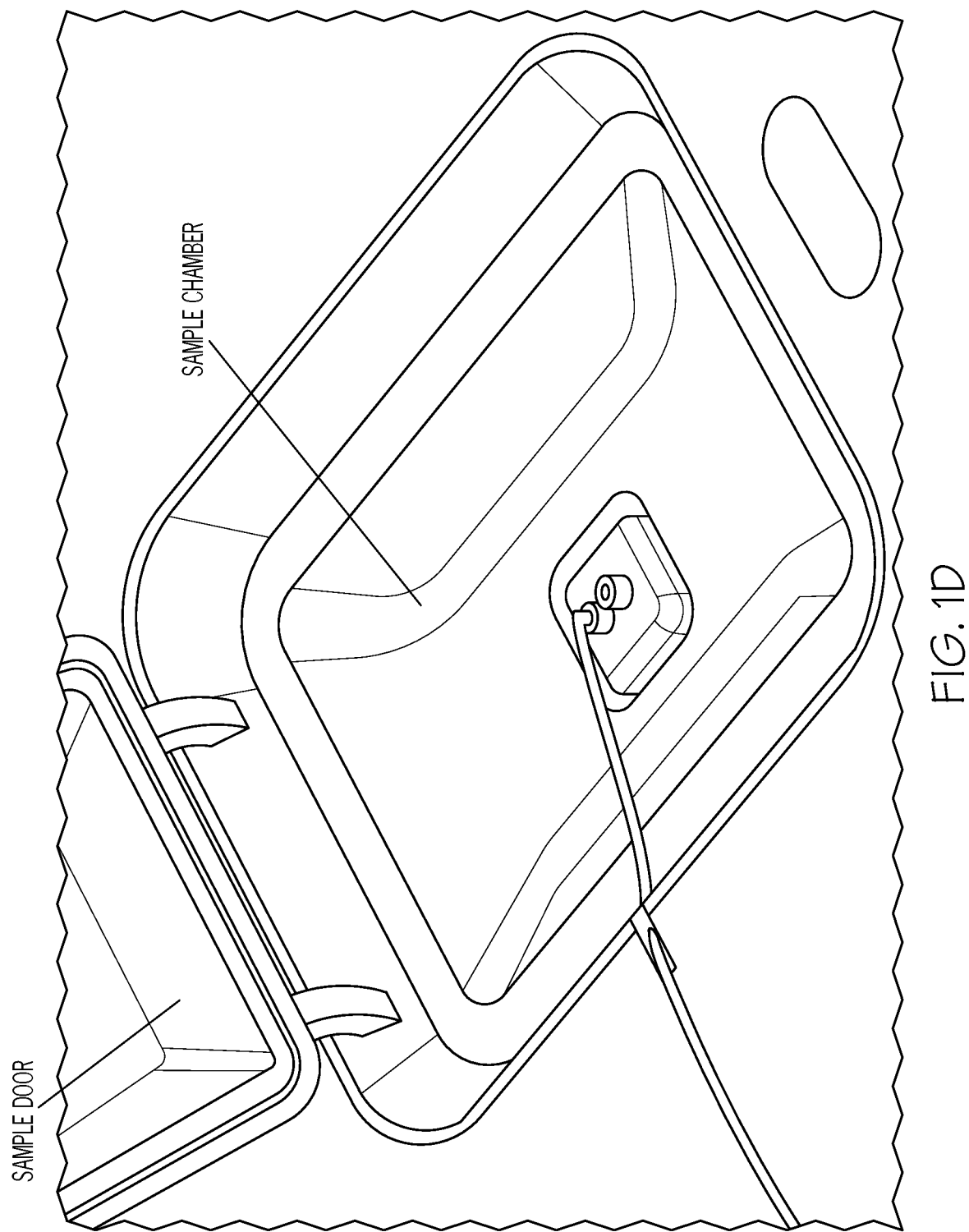
FIG. 1D depicts an apparatus in accordance with an exemplary embodiment.
Figure 1E:
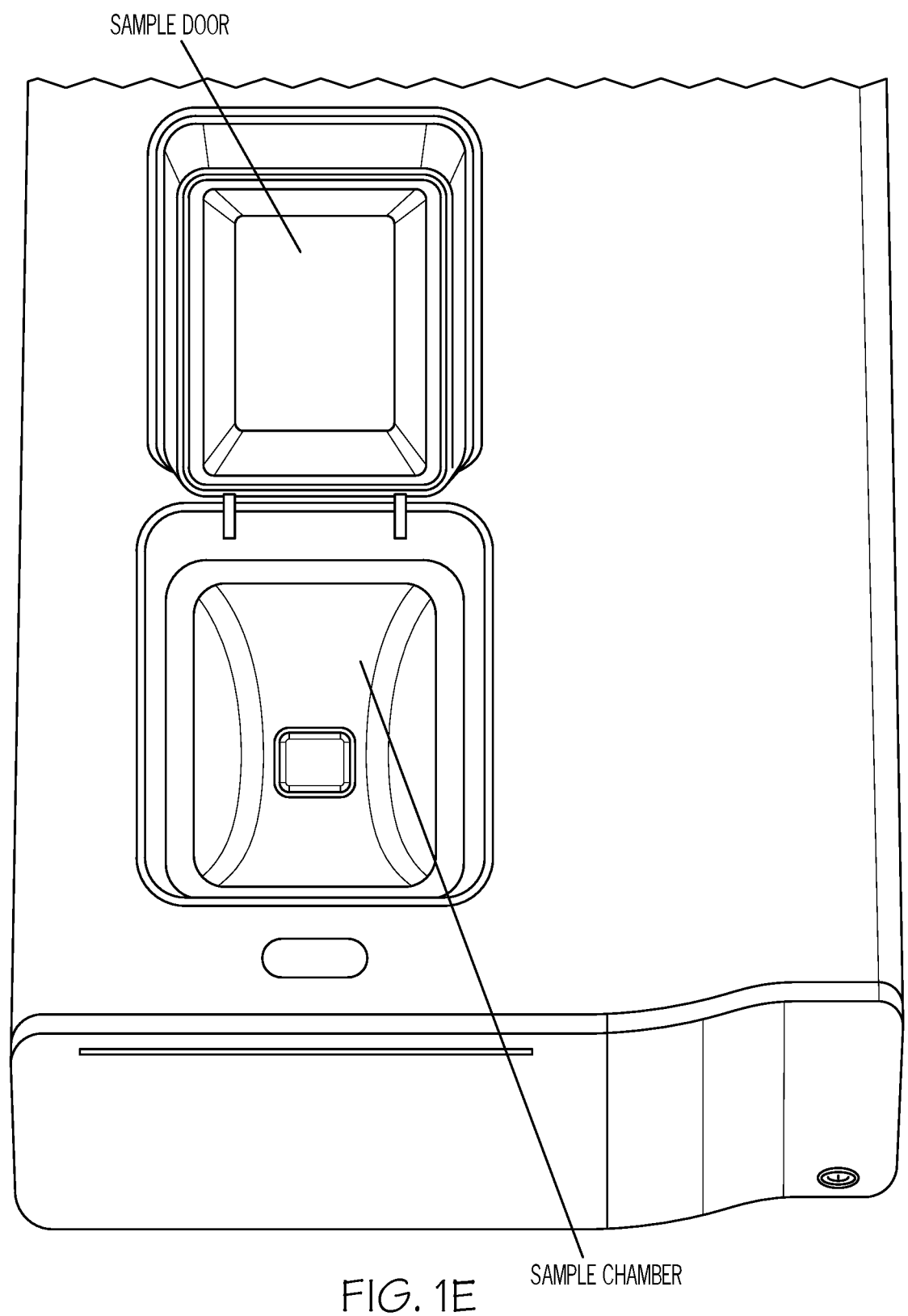
FIG. 1E depicts an apparatus in accordance with an exemplary embodiment.
Figure 2:
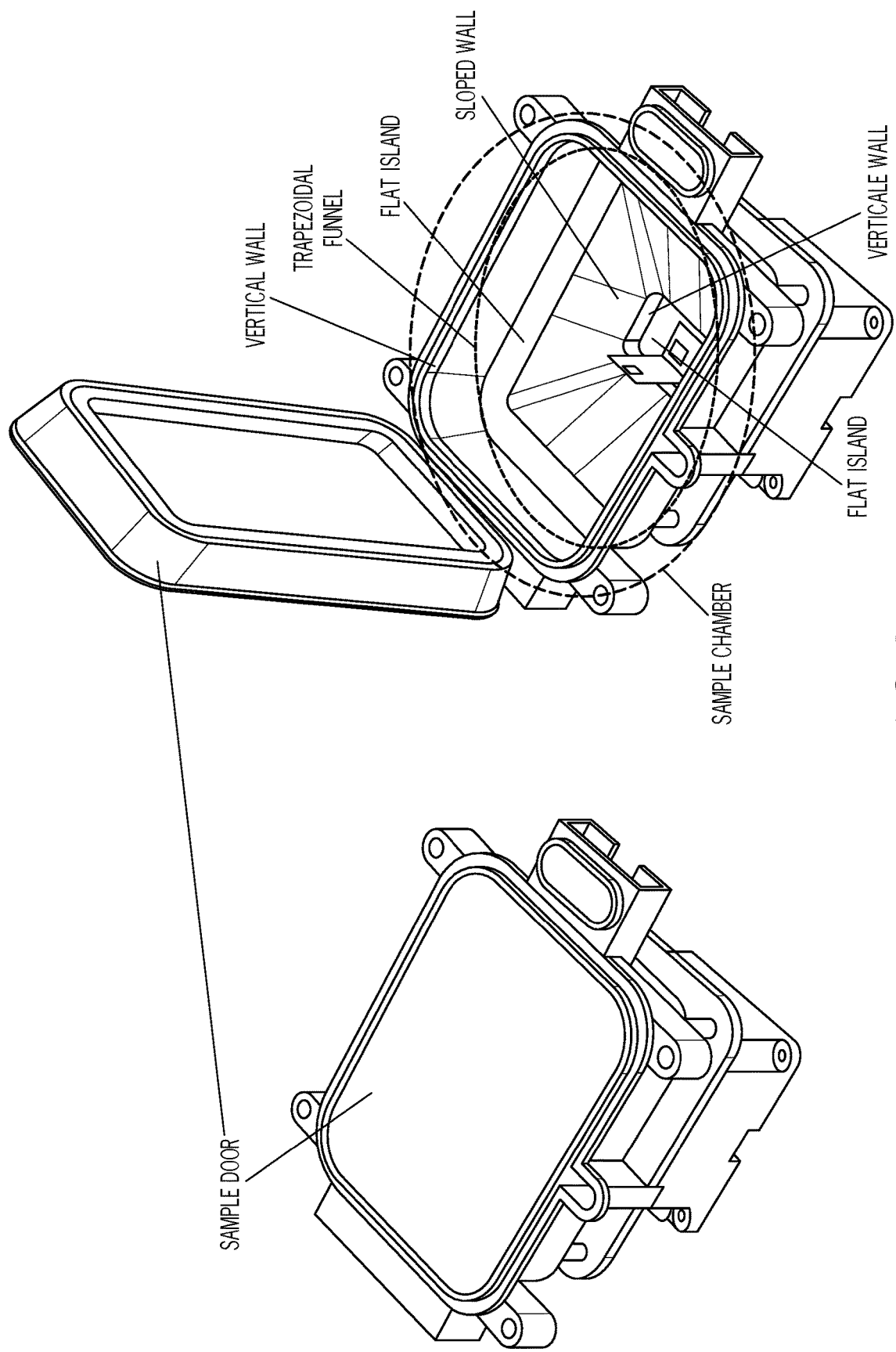
FIG. 2 depicts an apparatus in accordance with an embodiment.

In an embodiment, the sample chamber includes (a) a first set of at least four vertical walls, (b) at least four flat islands connected to the first set of at least four vertical walls, and (c) a trapezoidal funnel connected the at least four flat islands. In an embodiment, FIG. 2 depicts the sample chamber.

In an embodiment, the trapezoidal funnel includes (i) at least four sloped walls connected to the at least four flat islands, (ii) a second set of at least four vertical walls connected to the at least four sloped walls, and (iii) at least two flat islands connected to at least two vertical walls in the second set of at least four vertical walls, where the at least two vertical walls oppose each other (front & back, or right & left). In an embodiment, each of the at least four sloped wall has slope corresponding to 25 degree to 45 degree, incline/decline with respect to the top surface of the enclosure, +/−10 degrees. In an embodiment, the at least two vertical walls are the left and front right sides of the trapezoidal funnel. In an embodiment, the at least two vertical walls are the front and back sides of the trapezoidal funnel.

Sample Door

Figure 3:
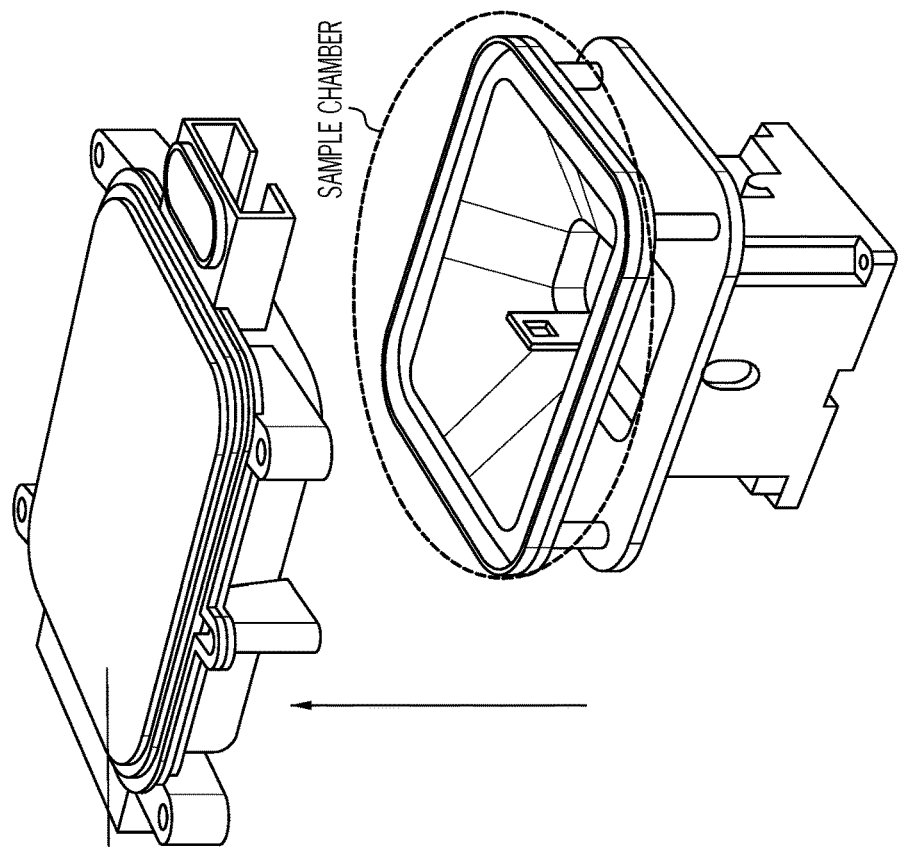
FIG. 3 depicts an apparatus in accordance with an embodiment.
Figure 3:
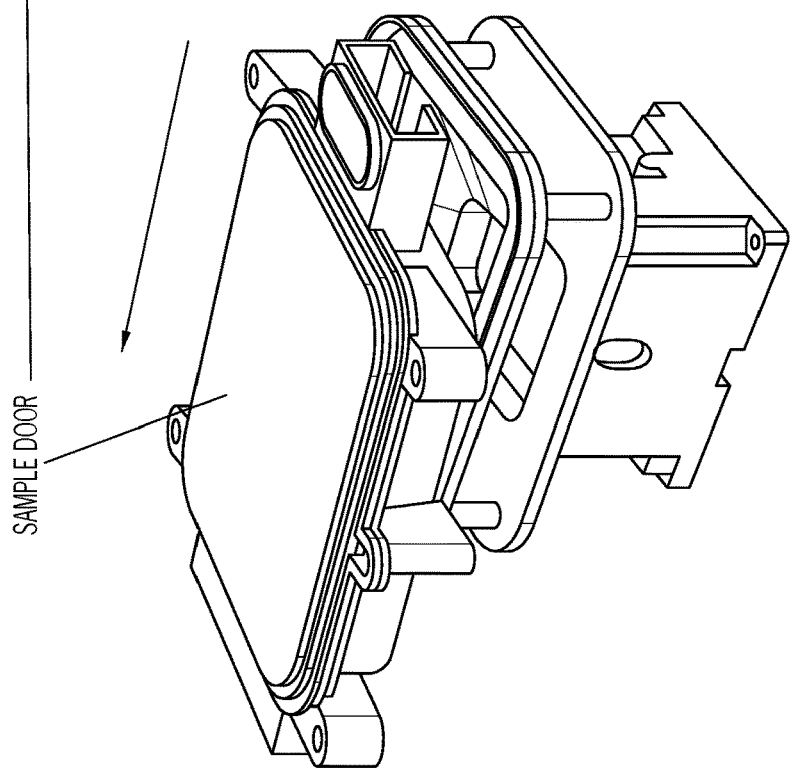

In an embodiment, the sample door is configured to be removable in tandem with the enclosure. In an embodiment, FIG. 2 and FIG. 3 depicts the sample door.

Receptacle

Figure 4:
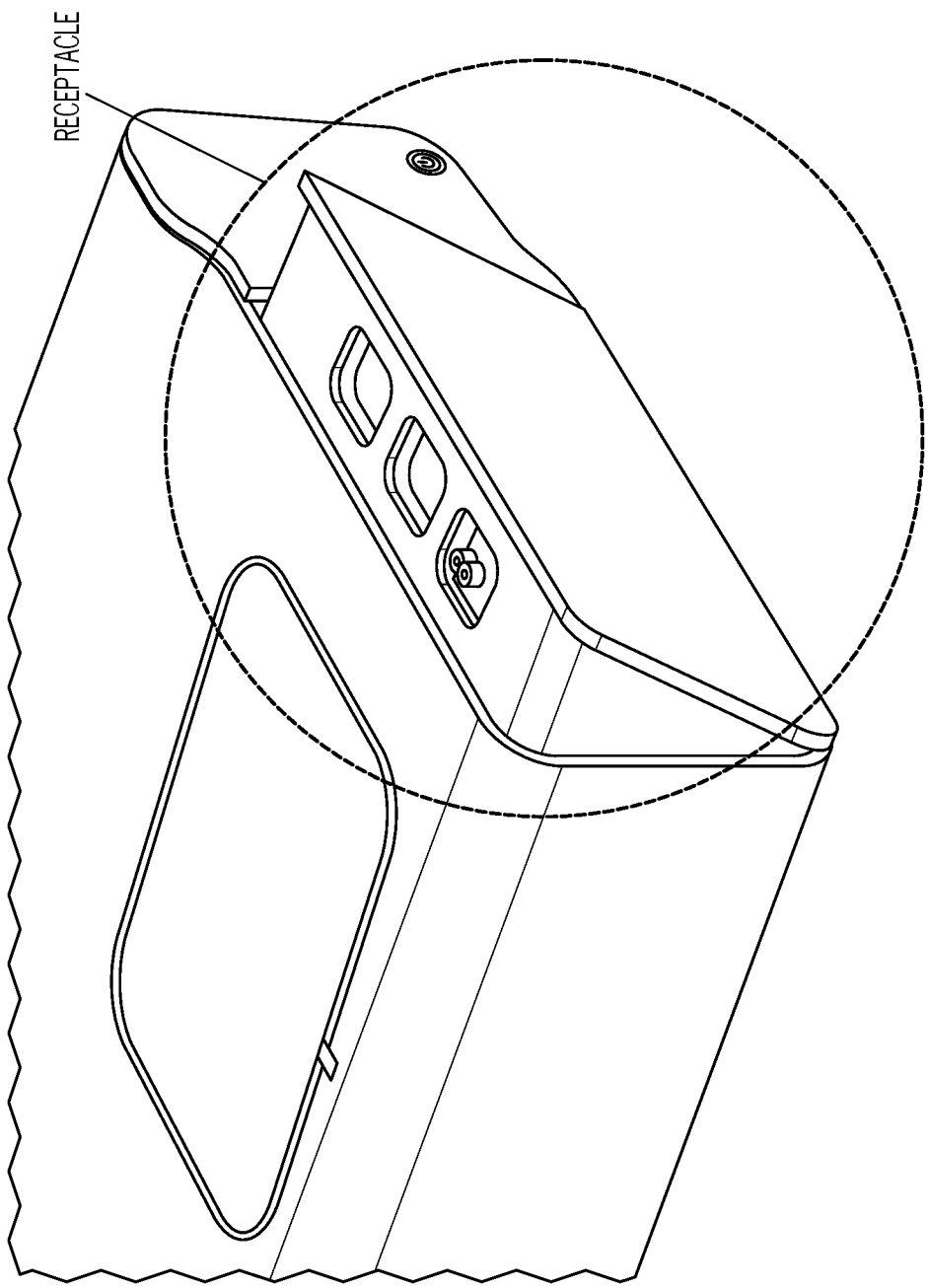
FIG. 4 depicts an apparatus in accordance with an embodiment.

In further embodiment, the apparatus further includes a receptacle coupled to the enclosure, where the receptacle is configured to store a plurality of sample cells. In an embodiment, the sample cells include cuvettes. In an embodiment, the sample cells are cuvettes. In an embodiment, FIG. 4 depicts the receptacle.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An apparatus comprising:
   at least one display coupled to an enclosure housing a light scattering measurement instrument, wherein the instrument is to measure at least one of dynamic light scattering, static light scattering, and electrophoretic light scattering, of at least one sample, wherein the at least one display is to allow for operating the instrument to acquire light scattering data from the sample and for accessing the data;

an indicator connected to an outside surface of the enclosure, wherein the indicator is to indicate at least one status of the instrument;

a sample chamber to accommodate at least one sample cell, wherein the sample chamber comprises
a first set of at least four vertical walls,
at least four flat islands connected to the first set of at least four vertical walls, and
a trapezoidal funnel connected to the at least four flat islands, wherein the trapezoidal funnel comprises at least four sloped walls connected to the at least four flat islands,
a second set of at least four vertical walls connected to the at least four sloped walls, and
at least two flat islands connected to at least two vertical walls in the second set of at least four vertical walls,
wherein the at least two vertical walls oppose each other, wherein each of the at least four sloped walls has a slope corresponding to 25 degrees to 45 degrees incline/decline with respect to a top surface of the enclosure;
and
a sample door connected to the enclosure,
wherein the sample door is to seal the sample chamber, thereby providing thermal insulation to the sample chamber.

2. The apparatus of claim 1 wherein the at least one display is coupled to the top surface of the enclosure at a location behind the sample chamber.

3. The apparatus of claim 1 wherein the accessing the data comprises at least one of displaying the data, printing the data, and transferring the data.

4. The apparatus of claim 1 wherein the sample door is to be removable in tandem with the enclosure.

5. The apparatus of claim 1 further comprising a receptacle coupled to the enclosure,
wherein the receptacle is to store a plurality of sample cells.

* * * * *